INVENTORS.
THEODORE C. GAMS
PAUL J. KIEFER JR.
BY *Norbert Ederer*
ATTORNEY

INVENTORS.
THEODORE C. GAMS
PAUL J. KIEFER JR.
BY Norbert Ederer
ATTORNEY

July 17, 1962 T. C. GAMS ET AL 3,044,725

TAPE FEEDING MEANS

Original Filed April 26, 1952 5 Sheets-Sheet 3

INVENTORS.
THEODORE C. GAMS
PAUL J. KIEFER JR.

BY Norbert Ederer

ATTORNEY

INVENTORS
THEODORE C. GAMS
PAUL J. KIEFER JR.
BY Norbert Ederer
ATTORNEY

TAPE FEEDING MEANS

Original Filed April 26, 1952 5 Sheets-Sheet 5

INVENTORS.
THEODORE C. GAMS
PAUL J. KIEFER JR.
BY Norbert Ederer
ATTORNEY

United States Patent Office 3,044,725

Patented July 17, 1962

3,044,725

TAPE FEEDING MEANS

Theodore C. Gams, Monsey, N.Y., and Paul J. Kiefer, Jr., Clifton, N.J., assignors, by mesne assignments, to Curtiss-Wright Corporation, Carlstadt, N.J., a corporation of Delaware Original application Apr. 26, 1952, Ser. No. 284,597, now Patent No. 2,778,634, dated Jan. 22, 1957. Divided and this application Apr. 17, 1956, Ser. No. 582,901

13 Claims. (Cl. 242—55.12)

This invention relates to means for feeding strip material, particularly magnetic record strip material or tape, at very high speed past operating means.

This application is a division of application Serial No. 284,597, filed April 26, 1952, now Patent 2,778,634.

The tape is of thin, relatively fragile and flexible material. It is intended to bear closely spaced lines of magnetically recorded designations, with a number of successive lines being grouped to constitute a data block. The line spacing may be as close as .01 inch and the inter-block spacing as small as .4 inch. It is desired to feed the tape at very high speed as, for instance, at a speed of 72 inches a second, past operating means such as a magnetic transducer head. One problem is to effect the tape feed positively at very high speed without slippage of the tape and without injury to the tape surface. Another problem is to initiate tape feed smoothly, to bring the tape up to speed rapidly and without tearing or snapping the tape. Still another problem is to interrupt tape feed within a reliably constant, extremely brief time interval in order that a desired particular section of the tape be stopped at the operating station. Thus, it may be necessary to stop the tape with an inter-block space at the operating station. The tape, moving at great speed, must therefore be brought to a halt in an interval so short that a particularly required tape section of a very small fraction of an inch will be stopped at the operating station.

Apparatus of the general character contemplated by the present invention is known in the art, examples being shown in United States Patents 2,011,653; 2,166,551; 2,432,876; 2,547,201; 2,708,554 and 2,860,325.

The present invention has as its general object the provision of novel tape handling apparatus for solving the above problems.

More specifically, an object of the invention is to provide novel means for effecting pneumatic clutching of the tape to or declutching from feed means, such as a continuously rotating capstan.

Another object of the invention is to provide a novel arrangement of pneumatic means for stopping the tape movement substantially instantaneously upon release of the tape from the grip of its feed means.

Another object of the invention is to provide novel magnetic means for rapidly operating a valve action to admit tape-clutching suction to or to remove such suction from tape feeding means. More specifically, it is intended to provide valve actuating means in the form of a magnetic device involving a movable coil which, upon energization, will react with a fixed magnetic field to develop self-impelling force which it will impart to the valve action. Such magnetic device, in a very short stroke, is capable of rapidly developing large accelerating force to effect extremely fast and positive operation of the actuated valve structure. The resulting time interval of operation is of exceedingly brief duration, which can be in the order of a fraction of a millisecond.

It is also an object of the invention to provide a novel circuit for the movable coil actuator.

The tape is to be fed between reels, one at each side of the operating means. To prevent excessive tension on the tape, it is formed into a loop below each reel. An object of the invention is to provide automatic means for maintaining the tape loops. More specificaly, it is intended to provide means for varying the reel speeds in accordance with the loop levels, so as to maintain each loop level within a permissible range.

An object of the invention is, also, to provide novel apparatus for feeding the tape selectively in either of opposite directions.

Other objects of the invention will become clear from the following description and claims and from the accompanying drawings, which disclose, by way of example, the principle of the invention and the best mode, which has been contemplated, of applying that principle.

Figure 1:
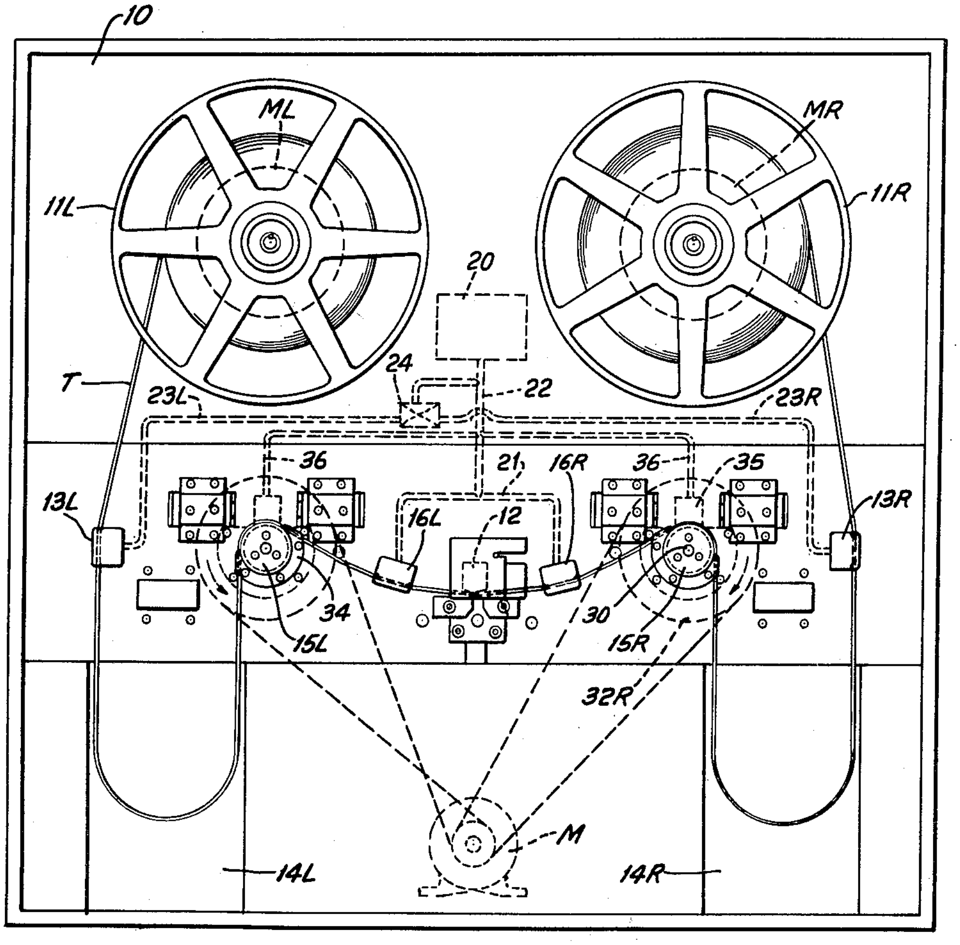
FIG. 1 is a front elevation of the novel tape feeding apparatus.

Referring to FIG. 1, the tape handling apparatus is mounted on a framework 10. Journaled on the framework are left and right tape reels 11R and 11L driven by motors MR and ML, respectively. The magnetic tape T may be fed in either direction, from the left reel to the right or vice versa, across a centrally positioned magnetic transducer head 12. The tape is guided from one reel, say the left reel 11L, through the channeled tracking element 13L, into a well 14L where it is formed into a loop. From well 14L, the tape is led over a capstan 15L, then through the channeled tape tensioning element 16L and past the transducer head 12. After passing the head 12, the tape is guided through the channeled tape tensioning element 16R, over a capstan 15R and into a well 14R. The tape is looped into the well and brought up, through the channeled element 13R, onto the reel 11R.

Figure 2:
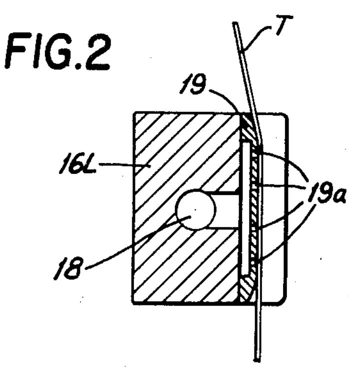
FIG. 2 is a section through one of the pneumatic, tape tensioning elements.

The channeled elements 13L and R and 16L and R are similarly constructed tape guiding and tensioning devices. Each of these elements, as shown for 16L in FIG. 2, comprises a block formed with a port 18 which opens into a space behind a face plate 19 provided with a plurality of apertures 19*a*. Port 18 is in communication with a vacuum pump 20 (see FIG. 1) by means of which suction may be produced at the face plate 19 to cause the tape T to be pressed to the plate. The tensioning elements 16L and R are in constant communication with the pump through ducts 21 and 22. On the other hand, the tensioning elements 13L and R are alternatively in communication with the pump, depending on the feed direction. The element 13L is connected to a pipe 23L and the element 13R to a pipe 23R. A solenoid-operated valve 24 is interposed between the pipes 23L and R and an elbow connection to the duct 22. When the tape is feeding to the right, the valve 24 will be in such position as to admit suction only to the element 13R. During reverse feed of the tape, the valve will admit suction only to the element 13L. Thus the proper one of the elements 13L and R will be effective to produce drag on the tape being taken up by a real, so as to maintain the tape taut.

Figure 3:
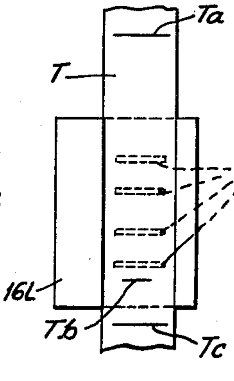
FIG. 3 is a face view of a fragment of the magnetic record tape passing through the guide channel formed in the tensioning element shown in FIG. 2.

FIG. 3 shows a fragment of magnetic record tape T within the channel of tensioning element 16L. The space between lines T*a* and T*b* defines the length of a data block and the space between lines T*b* and T*c* is the inter-block space.

Figures 4, 5:
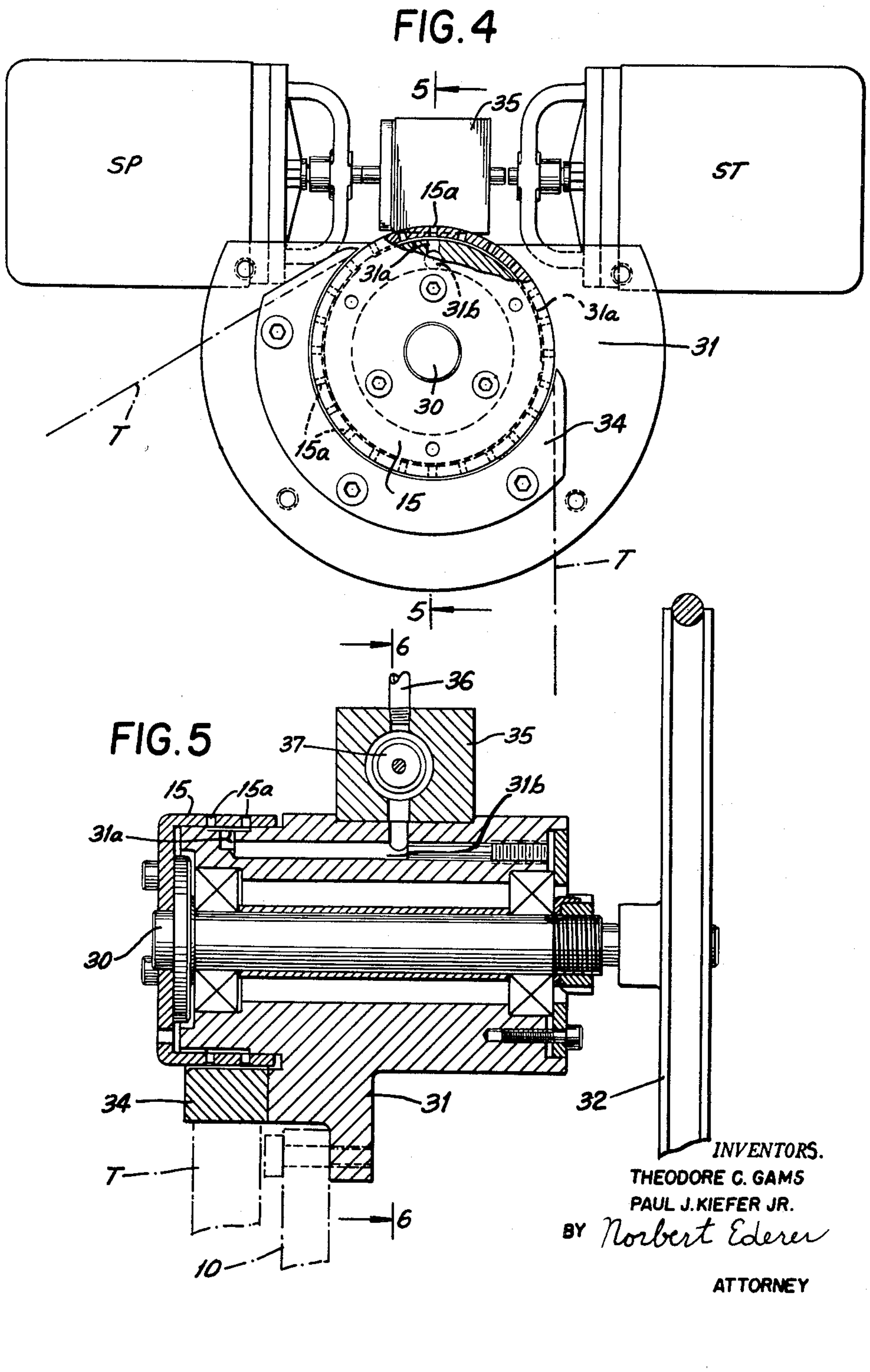
FIG. 4 is a front view of one of two feeding assemblies provided in the machine and is drawn on a larger scale than in FIG. 1.
FIG. 5 is a section on line 5—5 of FIG. 4.
Figure 6:
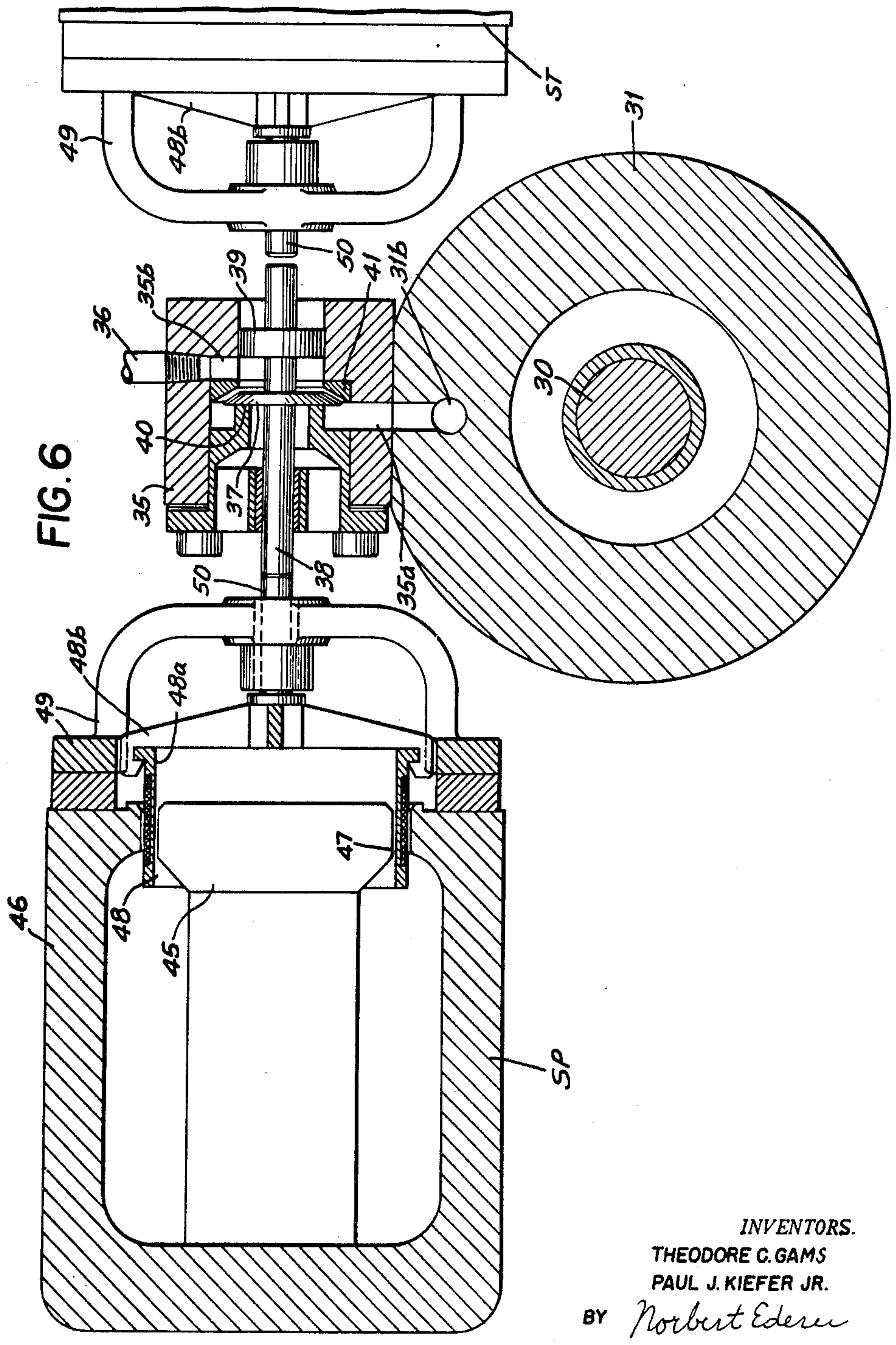
FIG. 6 is a section, on an enlarged scale, taken along line 6—6 of FIG. 5.

The capstans 15L and R are elements of a pair of similar left and right hand tape feeding assemblies. FIGS. 4, 5 and 6 show the construction of such assembly. The capstan 15 is clamped to a shaft 30 which is suitably journaled in a fixed bracket 31. The rear end of the shaft 30 is rigidly provided with a pulley 32 which is belt-driven by a motor M (see FIG. 1). The motor drives the shafts 30 of the left and right hand assemblies continuously, the drive connections being such as to rotate the capstan 15R clockwise and the capstan 15L counterclockwise.

Secured to the bracket 31 is a tape guide and stripper 34 which partially surrounds the capstan 15, so that the tape is guided over the stripper to the top arc of the capstan and then down past the stripper into the adjacent well 14. The capstan 15 is formed in its periphery with pairs of apertures 15*a*. During rotation of the capstan, the pairs of apertures 15*a* successively register with a port 31*a* which is formed in bracket 31 and in communication through a passage 31*b* with the outlet port 35*a* of a valve block 35. Valve block 35 is fixed to bracket 31 and its intake port 35*b* is connected by a duct 36 to the duct 22.

Slidably mounted inside the valve block 35 is a valve, which may be referred to as the capstan valve, comprising the valve head 37 fixed to a valve stem 38 on which is also fixed a closure cylinder 39. In the position shown in FIG. 6, the valve is in open position, allowing communication between the inlet and outlet ports of the valve block so as to admit suction to the capstan 15. In the open position of the valve, the back of the valve is firmly against an annular seat 40. It is to be noted that atmosphere is acting on the back area of the valve head exposed by the seat 40, that atmosphere is also acting on the outer end of the cylinder 39, and that vacuum is being applied to the face of the valve head. In the open position of the valve, the area of the valve head exposed to atmosphere is appreciably less than the exposed area of the cylinder 39 with the result that there is a greater atmospheric force acting on the right end of the valve than on the left end, the difference being adequate to maintain the valve in open position. In closed position of the valve, it has been shifted to the right so that the valve head is against a seat 41 and is shutting off the passage between the inlet port 35*b* and the outlet port 35*a*, thus removing the suction from the capstan 15. Further, with the valve head against the seat 41, it opens the port 35*a* to atmosphere, so that air rushes into the passage 31*b* and the port 31*a* (FIG. 5). Thus the pressure on both sides of the tape engaged with the capstan is equalized and the capstan no longer grips the tape. In closed position of the valve, the entire area of the back of the valve head is exposed to atmosphere. This area is appreciably greater than the exposed area of the cylinder 39 so that there is a differential atmospheric force acting on the valve to maintain it in closed position. Thus when the valve has been shifted to either position, it is self-maintained in the shifted position due to a differential atmopheric force acting on the valve in the proper direction.

The valve is shiftable from one position to the other by novel magnetic actuating means comprising a pair of magnetic units ST and SP. Each unit includes a fixed magnet and a movable coil. In the form shown, the fixed magnet is of the permanent type embodying an Alnico metal core 45 and an iron shell fixed to the core in a manner to provide a narrow annular magnetic gap 47. The movable coil 48 extends into the gap 47. This coil comprises a bobbin 48*a* of very light material, such as aluminum, formed with a flanged head which is fastened into a notched spider 48*b*, also of aluminum. The outer ends of the spider are slidably fitted into axially parallel notches formed on the inside of the ring portion of a cap

49 which is secured to the shell 46. The coil assembly is thus mounted to the permanent magnet structure for axially slidable movement. Fastened to the hub of the spider 48*b* is a rod 50 which passes freely through a hole in its cap 49. With the valve in open position (FIG. 6), the left end of the valve stem 38 is against the rod 50 of the coil 48 of the magnetic unit SP. Consequently, upon axial displacement of this coil outwardly from the permanent magnet, the rod 50 of the coil forces the valve to the right into closed position. In the closed position of the valve, the right end of its valve stem is against the rod 50 of the coil 48 of the unit ST. Outward axial displacement of the coil of unit ST will then cause its rod 50 to shift the valve back to open position.

It is to be noted that the permanent magnet structure 45—46 establishes an intense radial magnetic field across the magnetic gap 47. The axis of the coil 48 is at right angles to the radial magnetic field across the gap. Hence, upon energization of the coil, it will be threaded with a magnetic flux interacting with the fixed magnetic field to impel the coil in an axial direction. The direction of the energizing current through the coil determines whether it will be displaced inwardly towards or outwardly away from the fixed magnet. In the present case, current will be in a direction to cause outward displacement of the coil. The expression for the force generated in the coil at the beginning of current flow is:

$$Fo=\frac{B\times Io\times Lc}{10}$$

where B is the flux density at the coil due to the fixed magnet, $Io$ is the current through the coil, and $Lc$ is the effective length of the coil winding.

As indicated by the above expression, the force developed on the coil is proportional to the product of the fixed magnet field intensity and the current sent through the coil. Since the current threads the coil with a magnetic flux in air, which has no finite saturation limit, the force developed on the coil can be increased without limit by proportionally increasing the current. In practice, however, the current and, hence the force, is limited by the amount of current which can be sent through the coil without overheating the coil. Although the force developed on the coil can be extremely high, the coil itself can be extremely light since it need be comprised of only a very light body and a comparatively small number of turns of conductive wire. In view of the very high ratio of force which can be developed on the coil to the mass of the coil, its acceleration can be very large. Consequently, in a very short stroke of the coil, which need be no more than about .015 inch, the movable coil can impart sufficient force to the valve to shift its position with extreme rapidity. In practice, the acceleration developed has been estimated to approximate 500 *g*'s and the valve shifting interval has been found to be in the order of a fraction of a millisecond. Thus, the movable coil actuator can produce substantially instantaneous actuation of the valve to shut off suction from the capstan 15 or admit suction to the capstan.

To initiate tape feed to the right, the coil 48 of the magnetic unit ST of the right hand feed assembly will be energized. Energization of the coil will impel it outwardly to shift the valve head 37 of the right hand feed assembly to open position for admitting suction to the capstan 15R. The valve head 37 of the left hand feed assembly will remain in closed position, shutting off suction from capstan 15L. The motors ML and MR will be rotated counterclockwise so that the left hand reel 11L will unreel the tape while the right hand reel 11R will take up the tape. The suction force of the capstan 15R against the tape will be effective to overcome the suction force constantly being exerted on the tape by the tensioning elements 16L and R so that rotation of the capstan 15R (in clockwise direction) will draw the tape from the well 14L past the capstan 15L, the element 16L, the magnetic head 12, and the element 16R and into the well 14R, from which the tape will be taken up by the reel 11R.

To interrupt tape feed to the right, the coil 48 of magnetic unit SP of the right hand feed assembly will be energized, causing the valve head 37 of this assembly to shift to the right to remove the suction from the capstan 15R and admit atmosphere thereto. With the tape thus released from clutched contact with the capstan 15R, tensioning devices 16L and R take immediate effect and substantially instantaneously stop tape movement.

When tape feed is to take place to the left, then the direction of rotation of the reel motors ML and MR is clockwise, the valve 24 is shifted to admit suction to pipe 23L, and the coil 48 of unit ST of the left hand feed assembly is energized to instantly shift the valve head 37 of the latter assembly to open position. The tape is thereby clutched to the capstan 15L to be fed thereby to the left. To interrupt tape feed to the left, the coil 48 of unit SP of the left hand feed assembly is energized causing the capstan valve of this assembly to return to closed position, whereupon the capstan 15L releases its suction grip on the tape and the tensioning devices 16L and R immediately stop tape movement.

Figures 7, 8:
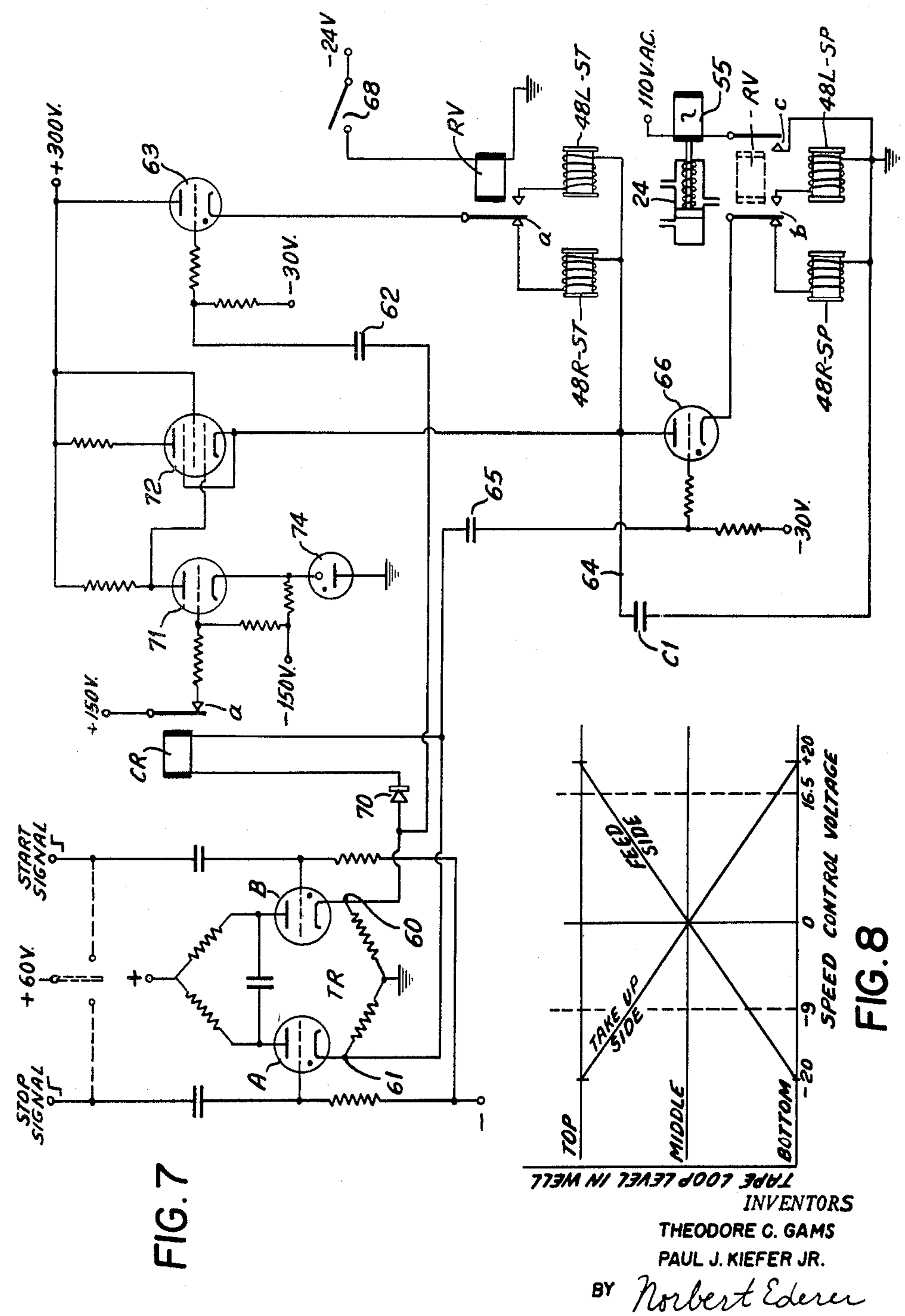
FIG. 7 is a schematic view which illustrates the circuitry of the tape feed control means.
FIG. 8 is a graph of the relations between the tape loop levels and the control voltages for the reel speeds.

FIG. 7 shows the circuits for energizing the movable coils 48 to control the capstan valves, and the solenoid 55 to control the valve 24 (see also FIG. 1). For ease of identification of the coils they are distinguished in FIG. 7 as follows: Coil 48R–ST is the movable coil of the magnetic unit ST of the right hand feed assembly; coil 48R–SP is the coil of the magnetic unit SP of the right hand feed assembly; and coils 48L–ST and 48L–SP are the coils of the units ST and SP of the left hand feed assembly.

When the tape is not feeding in either direction, the capstan valves of both feed assemblies are in closed positions so that the tape is not in feeding coaction with either capstan 15L or 15R (FIG. 1). Further, in the normal feed condition of the FIG. 7 circuits (relay RV deenergized), an applied start signal will result in the coil 48R–ST being energized to cause tape feed to the right.

Assuming the circuits are in normal feed condition, application of a momentary start signal to a double stability trigger circuit TR of known construction, is effective to switch conduction from gaseous discharge tube A to gaseous discharge tube B. Point 60 thereupon rises in potential while point 61 drops in potential. Upon the rise in potential of point 60, a positive pulse is transmitted by a small capacitor 62 to the grid of a thyratron tube 63, causing this tube to conduct. Current now flows from the plus 300 v. line through the tube 63, the normally closed side of contacts *a* of a relay RV, and through the coil 48R–ST to a line 64, thence through a large capacitor C1 to ground. The current flow exponentially decays as the capacitor C1 charges up, so that a current pulse of large amplitude but short duration is passed through the coil 48R–ST. Thyratron 63 stops conducting when the current decays to the extinction value but capacitor C1 is now charged. The current pulse energizes coil 48R–ST, causing it to shift the right hand capstan valve to open position, whereupon capstan 15R (FIG. 1) is effective to feed the tape, as previously described.

To interrupt tape feed, a momentary stop signal is applied to trigger TR, shifting conduction from tube B to tube A. Point 61 rises in potential and a pulse is transmitted by a capacitor 65 to the grid of a thyratron tube 66, overcoming its negative bias. The charged capacitor C1 thereupon discharges through the tube 66 via the normally closed side of relay contacts RV*b* through the coil 48R–SP. The capacitor discharge is in the form of an exponentially decaying current pulse which energizes the coil 48R–SP for shifting the right hand capstan valve to closed position, thus releasing the tape from the grip of the capstan 15R (FIG. 1), in the manner previously described.

To set the machine for reverse feed, a switch 68 is closed, causing energization of relay RV. The relay contacts RV*a* and *b* thereupon transfer disconnecting coils 48R–ST and 48R–SP from the circuit and bring coils 48L–ST and 48L–SP into circuit. Now, upon application of the start signal, the coil 48L–ST will be energized, and upon application of the stop signal, the coil 48L–SP will be energized.

It is to be noted that initiation of feed in either direction upon application of the start signal results in charging up the capacitor C1 in readiness to discharge through tube 66 upon application of the stop signal. During the interval between the start and stop signals, it is desirable to maintain the charge in capacitor C1 so that it may be effective as a source of current for the stop coil 48L–SP or 48R–SP, when the stop signal is applied. To maintain the charge in the capacitor C1 during the interval between the start and stop signals, means including a relay CR are provided. When the start signal is applied, causing point 60 of trigger circuit TR to rise in potential, current flows through a rectifier 70 and the relay CR to the point 61. As long as the trigger TR remains in the state in which point 60 is as high potential and point 61 at low potential, the relay CR remains energized. With relay CR energized, relay contacts CR*a* are open, removing positive potential from the grid of a vacuum triode 71. The normal negative bias of the triode takes control and cuts it off. In cut-off state of the triode, its anode is at high enough potential to condition a pentode 72 to conduct. The cathode of 72 connects to line 64, so that current flow through the pentode is effective to maintain the capacitor C1 charged up. When the stop signal is applied to the trigger TR, point 60 drops in potential and point 61 rises in potential, so that relay CR is deenergized. Relay contacts CR*a* close and triode 71 becomes conductive, causing its anode potential to decrease sufficiently to cut off the pentode 72. Hence, there will be no circuit for replenishing the charge in capacitor C1 which is now discharging through thyratron 66, and the current pulse through the stop coil 48L–SP or 48R–SP will not be prolonged but will be essentially a true exponentially decaying pulse.

It is to be noted that a cold cathode diode 74 is provided to maintain the cathode potential of triode 71 at a constant level, which may be in the order of —75 v. As an example each movable coil 48 may have a resistance of 10 ohms. The capacitor C1 may have a value of 80 mfds. Thyratrons 63 and 66 may be of type C3J, triode 71 of type 6J5, diode 74 of type 0A3, and pentode 72 of type 6SJ7.

When the circuits are conditioned for reverse feed, the relay RV is in energized condition. Relay contacts RV*c* are thereby closed to complete the circuit of solenoid 55. The energized solenoid adjusts the valve 24 to position for admitting suction to duct 23L (FIG. 1).

Figure 9:
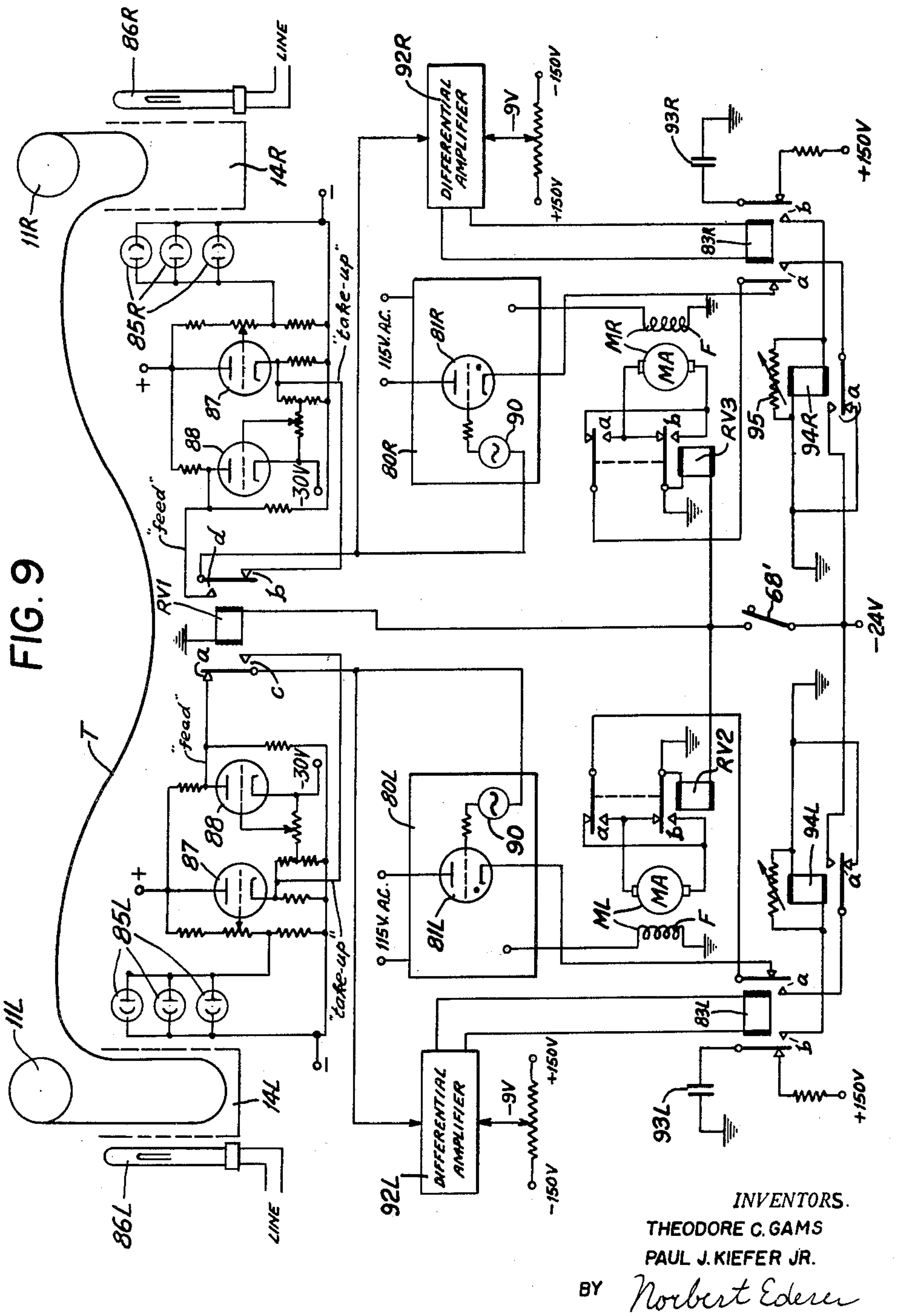
FIG. 9 is a schematic view which shows the circuitry of the reel driving means.

FIG. 9 shows the control circuits for the motors ML and MR of the reels 11L and 11R (also see FIG. 1). In the normal feed condition of these circuits, they are set consistently with the demands of tape feed to the right; that is, the motors ML and MR are prepared to receive current in a direction to cause them to rotate counterclockwise. The motor speeds will be automatically regulated according to the levels of the adjacent tape loops in the wells 14L and R (also see FIG. 1).

The fields F of the motors ML and MR will be supplied with constant potential by full wave rectifiers (not shown) in the A.C. powered units diagrammatically indicated by blocks 80L and 80R. The motor armatures MA will be supplied with pulses of half wave rectified voltage by circuits including thyratrons 81L and 81R, the anodes of which are connected to one side of the A.C. supply. Normally, the relays RV1, 2 and 3 are not energized. Relay contacts *a* and *b* of relay RV2 are then in condition to complete a circuit through armature MA of motor ML as follows: from one side of the A.C. line, through the thyratron 81L, the normally closed sides of contacts $a$ of relays 83L and RV2, thence through armature MA of motor ML, the normally closed side of contacts $b$ of relay RV2, and to ground. The direction of current through the armature is such that the motor ML will turn counterclockwise, in tape feed direction.

At the same time, current will flow through armature MA of motor MR via thyratron 81R, the normally closed side of contacts $a$ of relay 83R, the normally closed side of contacts $a$ of relay RV3, through armature MA of relay MR, and via the normally closed side of contacts $b$ of RV3 to ground. The direction of current through the armature MA of motor MR is such as to cause it to turn counterclockwise, in take-up direction.

To condition the motors ML and MR for reverse feed, the switch 68′ is closed, causing energization of relays RV1, 2, and 3. With contacts $a$ and $b$ of relays RV2 and 3 transferred, the direction of current flow through armatures MA is reversed, so that motors ML and MR will turn clockwise, respectively to take up and to feed tape.

The speeds of motors ML and MR vary automatically according to the levels of the adjacent tape loops. The loop level is sensed by a set of three photocells 85 in coaction with a lamp 86. Light from the lamp projects through openings in a side of a well and the light not intercepted by the loop in the well passes through openings in the opposite side of the well to the set of photocells. The illumination and consequent energization of the photocells thus vary directly as the height of the loop. Energization of the photocells controls the bias on a tube 87, the arrangement providing for the bias voltage to vary in direct proportion (negative proportionality constant) to the amount of energization of the photocells. It is clear then that the potential of the cathode line designated "take-up" increases as the level of the associated tape loop falls and decreases as the level rises. Connected to the tube 87 is a phase inverting tube 88, the output line "feed" of which assumes a voltage and voltage variation opposite that of the line "take-up."

With the circuits conditioned for tape feed to the right, the relay RV1 is deenergized and its contacts $a$ and $b$ are closed while its contacts $c$ and $d$ are open. The left "feed" line is then in series with a 90 degree lagging phase bias circuit 90 for the thyratron 81L, while the right hand "take-up" line is in series with a similarly phase-shifted bias circuit for the thyratron 81R. The voltage of the line in series with the phase shift circuit governs the firing "angle" of the thyratron during the positive half of the A.C. voltage wave applied to the anode of the thyratron.

FIG. 8 shows the relation between the loop levels and the voltages on the operative "feed" and "take-up" lines. When the tape is feeding to the right and the loop level in well 14R is at the bottom, the voltage on the right hand "take-up" line is greatest. Therefore, the thyratron firing angle will be large and the motor MR will speed up, causing the reel 11R to take up the tape more rapidly. As the loop rises, the voltage on the "take-up" line decreases, the thyratron firing angle diminishes, and the motor MR reduces speed. In normal operation, the voltage on the "take-up" line will not exceed 16.5 v. or fall below −9 v. and the motor will operate at a speed for maintaining the loop level within a proper range. The control of the speed of the feed motor by the voltage on the line "feed" is effected similarly but it is to be noted that the voltage on this line varies directly (positive proportionally constant) as the height of the loop, so that the motor will speed up if the loop level is rising and will slow down when the loop level is descending.

To set the circuits for feeding of the tape to the left, switch 68′ is closed and relays RV1, 2, and 3 are energized. With RV1 energized, the relay contacts are transferred and place the left hand "take-up" line in series with the grid phasing circuit 90 of tube 81L and the right hand "feed" line in series with the circuit 90 of tube 81R.

When tape feed is interrupted by removing the suction from the active capstan, the take-up reel continues to turn until its related loop rises to the level where the voltage on the line "take-up" falls below −9 v. Similarly, the feed reel continues to turn until its related loop drops to the level where the voltage on the line "feed" drops to −9 v. This so negatively biases the thyratrons 81L and R, that the tubes will not fire at all and will not supply current to the related motor armatures MA. If the take-up motor were allowed to coast to a stop, the take-up reel might snap the tape. Therefore, means are provided to positively prevent coasting of the motors when feed is interrupted. For this purpose, the movable contacts of relay RV1 are connected to respective differential amplifiers 92 and their respective voltages are equated against a standard of −9 v. When the input voltage of the differential amplifier falls below −9 v., the differential amplifier energizes a relay 83. In the deenergized state of this relay, its contact $b$ establishes a charging circuit for a capacitor 93. Upon energization of the relay, contacts $b$ transfer and the capacitor discharges through a relay 94. The latter relay transfers its points $a$, completing a circuit for sending reverse current through the armature of the respective motor. For simplicity, the remaining description is restricted to the "take-up" system; the "feed" system functions analogously. For instance, with tape feed to the right taking place, the current supplied to the armature of motor MR by thyratron 81R is in a direction to cause counterclockwise turning of the motor. When tape feed is interrupted, differential amplifier 92R causes relay 83R to be energized, resulting in the energization of relay 94R. A circuit is thereupon completed from the −24 v. line through the transferred contacts $a$ of 94R, the transferred points $a$ of relay 83R, thence via contacts $a$ of RV3, through MA of motor MR and via contacts $b$ of RV3 to ground. The polarity of the current fed by this circuit to the motor MR is opposite that which has been fed to the motor by thyratron 81R. Accordingly, the motor will tend to reverse its direction from counterclockwise to clockwise rotation. As a result, the take-up action of the motor will be positively arrested.

Relay 94 is energized momentarily by the capacitor 93. The period of energization is adjustable by setting a variable resistor 95 which is in shunt with relay 94, so as to open the reversing circuit of the motor before it actually starts turning in the reverse direction. When the relay is deenergized, its contacts $a$ return to normal and with relay 83 still energized, ground is connected to opposite terminals of the motor armature MA, causing the motor to be dynamically braked to a stop. Thus relay 94 and associated circuit elements form a pulsing means, whose action is self-terminated upon lapse of predetermined time interval after initiation of the action.

What is claimed is:

1. A high speed tape feeding apparatus comprising a pair of reels between which the tape feeds, one of the reels of said pair operating as a supply reel while the other operates as a take up reel, said tape being formed with two loops, one each depending below the level of one respective reel; means to feed the tape at high speed from said supply reel to said take up reel; a first motor being provided for rotating said supply reel at a high speed, a second motor being provided for rotating said take up reel at a high speed; control means, including sensing means that is substantially linearly responsive to any change in the length of the tape loop associated with said supply reel and is physically independent of such tape loop, for varying the speed of said first motor in response to said sensing means; and other control means, including sensing means that is substantially linearly responsive to any change in the length of the tape loop associated with said take up reel and is physically independent of such tape loop, for varying the speed of said second motor in response to the latter sensing means, the two said control means being oppositely responsive to the same direction of change of their respective tape loops.

2. A high speed tape feeding apparatus comprising a pair of reels between which the tape feeds, one of the reels of said pair operating as a supply reel while the other operates as a take up reel; a tape feeding means, said tape being guided by said tape feeding means and being formed with two loops, one each depending below the level of one respective reel, said tape feeding means being effective to feed said tape at high speed; a first motor being provided for rotating said supply reel at a high speed; a second motor being provided for rotating said take up reel at a high speed; control means, including sensing means that is substantially linearly responsive to decrease and increase in the length of the tape loop associated with said supply reel and is physically independent of such loop, for respectively increasing and decreasing the speed of said first motor in response to said sensing means; and other control means, including sensing means that is substantially linearly responsive to decrease and increase in the length of the tape loop associated with said take up reel and is physically independent of such loop, for respectively decreasing and increasing the speed of said second motor in response to the latter sensing means.

3. A high speed tape feeding mechanism comprising a reel, a tape moving means, a length of tape wound on said reel and coupled to said tape moving means, the tape forming a dependent loop between the reel and said tape moving means, rotatable means coupled to said reel to feed the tape from the reel to said tape moving means, sensing means responsive to the length of the tape loop, pulsing means activated by said sensing means and operative to urge said rotatable means in a reverse direction for a limited time interval, and dynamic braking means activated by said pulsing means and coupled to said rotatable means to further inhibit the rotation of said rotatable means.

4. A high speed tape feeding mechanism comprising a reel, a tape moving means, a length of tape wound on said reel and coupled to said tape moving means, the tape forming a dependent loop between the reel and said tape moving means, photoelectric sensing means continuously responsive to the length of the tape loop, variable speed rotatable means fed by said photoelectric sensing means and coupled to said reel to feed the tape from said reel to said tape moving means to provide a loop of substantially constant length, and dynamic electrical braking means activated by said photoelectric sensing means at a predetermined loop length and coupled to said variable speed rotatable means to stop said variable speed rotatable means rapidly.

5. A high speed tape feeding mechanism comprising a reel, a tape moving means, a length of tape wound on said reel and coupled to said tape moving means, the tape forming a dependent loop between said reel and said tape moving means, photoelectric sensing means continuously responsive to the length of the tape loop, variable speed rotatable means fed by said photoelectric sensing means and coupled to said reel to feed the tape from said reel to said tape moving means to provide a loop of substantially constant length, pulsing means activated by said photoelectric sensing means at a predetermined loop level and operative to urge said rotatable means in a reverse direction for a limited time interval, and dynamic braking means activated by said pulsing means and coupled to said rotatable means to further inhibit the rotation of said rotatable means.

6. A high speed tape feeding mechanism comprising a reel, a tape moving means, a length of tape wound on said reel and coupled to said tape moving means the tape forming a dependent loop between the reel and said moving means, electrically driven rotatable means coupled to said reel to feed the tape from the reel to said tape moving means, sensing means responsive to the length of the tape loop, pulsing means energized by said sensing means at a predetermined loop level to reverse the directional flow of the current through said rotatable means and effective to urge said rotatable means in a reverse direction for a limited time interval, and dynamic braking means activated by said pulsing means and coupled to said rotatable means to further inhibit the rotation of said rotatable means.

7. A high speed tape feeding apparatus comprising a pair of reels between which the tape feeds, one of the reels of said pair operating as a supply reel while the other operates as a take up reel, said tape being formed with a supply-side loop and a take-up-side loop, one each loop depending below the level of the respective reel, means to feed the tape at high speed from said supply reel to said take up reel, a supply reel motor being provided for rotating said supply reel at a high speed, a take up reel motor being provided for rotating said take up reel at a high speed, and an individual loop length control system for each said loop, said control systems being oppositely responsive to the same direction of change of their respective tape loops, each control system comprising: a plurality of discrete sensing devices disposed in generally vertically spaced relation to one another adjacent to the path of ascent and descent of the respective tape loop and physically independent of such loop, each sensing device providing a loop-level-indicative electrical signal of the continuously variable type as distinguished from the on-off type, means to combine the electrical signals into a single electrical signal of the continuously variable type, the latter signal representing the length of the respective loop, and circuit means continuously responsive to said latter signal to vary continuously the speed of the respective reel motor so as to tend to maintain the length of the respective loop at a desired value.

8. A high speed tape feeding apparatus comprising a pair of reels between which the tape feeds, one of the reels of said pair operating as a supply reel while the other operates as a take up reel, said tape being formed with a supply-side loop and a take-up-side loop, one each loop depending below the level of the respective reel, means to feed the tape at high speed from said supply reel to said take up reel, a supply reel motor being provided for rotating said supply reel at a high speed, a take up reel motor being provided for rotating said take up reel at a high speed, and an individual loop length control system for each said loop, said control systems being oppositely responsive to the same direction of change of their respective tape loops, each control system comprising: a plurality of photoelectric cells disposed in generally vertically spaced relation to one another adjacent to the path of ascent and descent of the respective tape loop and physically independent of such loop, lighting means for directing light across said path toward said cells, each cell producing a photoelectric signal of the continuously variable type as distinguished from the on-off type, means to combine the photoelectric signals into a single electrical signal of the continuously variable type, the latter signal representing the length of the respective loop, and circuit means continuously responsive to said latter signal to vary continuously the speed of the respective reel motor so as to tend to maintain the length of the respective loop at a desired value.

9. A high speed tape feeding apparatus comprising a pair of reels between which the tape feeds, one of the reels of said pair operating as a supply reel while the other operates as a take up reel, said tape being formed with a supply-side loop and a take-up-side loop, one each loop depending below the level of the respective reel, means to feed the tape at high speed from said supply reel to said take up reel, a supply reel motor being provided for rotating said supply reel at a high speed, a take up reel motor being provided for rotating said take up reel at a high speed, and an individual loop length control system for each said loop, said control systems being oppositely responsive to the same direction of change of their respective tape loops, each control system comprising: a plurality of photoelectric cells disposed in generally vertically spaced relation to one another adjacent to the path of ascent and descent of the respective tape loop and on one side of such path and physically independent of such loop, lighting means disposed on the other side of said path for directing discrete beams of light across said path toward said cells, each cell producing a photoelectric signal of the continuously variable type as distinguished from the on-off type, means to combine the photoelectric signals into a single electrical signal of the continuously variable type, the latter signal representing the length of the respective loop, and circuit means continuously responsive to said latter signal to vary continuously the speed of the respective reel motor so as to tend to maintain the length of the respective loop at a desired value.

10. A high speed tape feeding mechanism comprising a reel, a tape moving means, a length of tape wound on said reel and coupled to said tape moving means, the tape forming a dependent loop between the reel and said tape moving means, rotatable means coupled to said reel to feed the tape from said tape moving means to the reel, sensing means responsive to the length of the tape loop, pulsing means activated by said sensing means and operative to urge said rotatable means in a reverse direction for a limited time interval, and dynamic braking means activated by said pulsing means and coupled to said rotatable means to further inhibit the rotation of said rotatable means.

11. A high speed tape feeding mechanism comprising a reel, a tape moving means, a length of tape wound on said reel and coupled to said tape moving means, the tape forming a dependent loop between the reel and said tape moving means, photoelectric sensing means continuously responsive to the length of the tape loop, variable speed rotatable means fed by said photoelectric sensing means and coupled to said reel to feed the tape from said tape moving means to said reel to provide a loop of substantially constant length, and dynamic electrical braking means activated by said photoelectric sensing means at a predetermined loop length and coupled to said variable speed rotatable means to stop said variable speed rotatable means rapidly.

12. A high speed tape feeding mechanism comprising a reel, a tape moving means, a length of tape wound on said reel and coupled to said tape moving means, the tape forming a dependent loop between said reel and said tape moving means, photoelectric sensing means continuously responsive to the length of the tape loop, variable speed rotatable means fed by said photoelectric sensing means and coupled to said reel to feed the tape from said tape moving means to said reel to provide a loop of substantially constant length, pulsing means activated by said photoelectric sensing means at a predetermined loop level and operative to urge said rotatable means in a reverse direction for a limited time interval, and dynamic braking means activated by said pulsing means and coupled to said rotatable means to further inhibit the rotation of said rotatable means.

13. A high speed tape feeding mechanism comprising a reel, a tape moving means, a length of tape wound on said reel and coupled to said tape moving means, the tape forming a dependent loop between the reel and said moving means, electrically driven rotatable means coupled to said reel to feed the tape from said tape moving means to the reel, sensing means responsive to the length of the tape loop, pulsing means energized by said sensing means at a predetermined loop level to reverse the directional flow of the current through said rotatable means and effective to urge said rotatable means in a reverse direction for a limited time interval, and dynamic braking means activated by said pulsing means and coupled to said rotatable means to further inhibit the rotation of said rotatable means.

References Cited in the file of this patent

UNITED STATES PATENTS

| | | |
|---|---|---|
| 2,223,728 | Kenyon | Dec. 3, 1940 |
| 2,364,556 | Somers | Dec. 5, 1944 |
| 2,379,132 | Cook | June 26, 1945 |

Notice of Adverse Decision in Interference

In Interference No. 93,547 involving Patent No. 3,044,725, T. C. Gams and P. J. Kiefer, Jr., Tape feeding means, final judgment adverse to the patentees was rendered Oct. 15, 1964, as to claims 3, 6, 10 and 13.

[*Official Gazette December 22, 1964.*]